United States Patent
Xu-Hui et al.

(10) Patent No.: US 8,328,226 B2
(45) Date of Patent: Dec. 11, 2012

(54) DIRECTION CHANGEABLE STROLLER

(75) Inventors: Chen Xu-Hui, Taipei (TW); Chen Shun-Min, Taipei (TW)

(73) Assignee: Wonderland Nurserygoods Company Limited, Central Hong Kong (HK)

( * ) Notice: Subject to any disclaimer, the term of this patent is extended or adjusted under 35 U.S.C. 154(b) by 206 days.

(21) Appl. No.: 12/903,757

(22) Filed: Oct. 13, 2010

(65) Prior Publication Data

US 2011/0285110 A1 Nov. 24, 2011

(30) Foreign Application Priority Data

May 19, 2010 (CN) .......................... 2010 1 0179308

(51) Int. Cl.
*B62B 1/12* (2006.01)

(52) U.S. Cl. ........ 280/643; 280/648; 280/650; 280/658; 280/47.39

(58) Field of Classification Search .......... 280/642–643, 280/647, 648.65, 657–658, 47.38–47.41
See application file for complete search history.

(56) References Cited

FOREIGN PATENT DOCUMENTS

| CN | 87106144 A | 3/1988 |
| CN | 101687518 A | 3/2010 |
| JP | 2002-284015 | * 10/2002 |

* cited by examiner

*Primary Examiner* — Jeffrey J Restifo
*Assistant Examiner* — Erez Gurari
(74) *Attorney, Agent, or Firm* — Frommer Lawrence & Haug LLP; Ronald R. Santucci

(57) ABSTRACT

A direction changeable stroller comprises a frame unit that includes a side leg frame and a push handle pivotable between front and rear positions. The side leg frame includes front and rear leg tubes, and front and rear wheel assemblies. Each of the front and rear wheel assemblies includes a wheel seat and a wheel. Each of the wheel seats includes a fixed portion connected fixedly to a corresponding one of the front and rear leg tubes, and a rotating portion connected pivotably to the fixed portion. The side leg frame further includes an automatic direction-limiting mechanism connected to the push handle such that, when the push handle is at a selected one of the front and rear positions, relative rotation between the fixed portion and the rotating portion of a corresponding one of the front and rear wheel seats is prevented.

12 Claims, 10 Drawing Sheets

DIRECTION CHANGEABLE STROLLER

CROSS-REFERENCE TO RELATED APPLICATION

This application claims priority of Chinese Application NO. 201010179308.9, filed on May 19, 2010, the disclosure of which is incorporated herein by reference.

BACKGROUND OF THE INVENTION

1. Field of the Invention

This invention relates to a direction changeable stroller, and more particularly to a direction changeable stroller that can automatically limit the directions of wheels disposed at a trailing side relative to the moving direction of the stroller.

2. Description of the Related Art

A conventional direction changeable stroller includes a push handle that can be changed between front and rear positions. When the push handle is disposed at the rear position, the baby seated on the stroller faces forwardly. When the push handle is disposed at the front position, the baby faces rearwardly toward the person pushing the stroller. The push handle can be disposed at a selected one of the front and rear positions according to the user's need during use.

However, the conventional direction changeable stroller has four wheel assemblies (i.e., two front wheel assemblies and two rear wheel assemblies). When the stroller is moved, to control the moving direction of the stroller, it is necessary to enable free rotation of wheels at a leading side and to limit the directions of wheels at a trailing side. That is, when the push handle is at the rear position, the directions of wheels of the rear wheel assemblies need to be limited, and when the push handle is at the front position, the directions of wheels of the front wheel assemblies need to be limited. Thus, it is desirable to automatically limit the directions of the wheels of the front or rear wheel assemblies when the push handle is disposed at a corresponding one of the front and rear positions.

SUMMARY OF THE INVENTION

The object of this invention is to provide a direction changeable stroller that can automatically limit the direction of front or rear wheels during movement of the stroller.

According to this invention, a direction changeable stroller comprises a frame unit that includes a side leg frame and a push handle pivotable between front and rear positions. The side leg frame includes front and rear leg tubes, and front and rear wheel assemblies. Each of the front and rear wheel assemblies includes a wheel seat and a wheel. Each of the wheel seats includes a fixed portion connected fixedly to a corresponding one of the front and rear leg tubes, and a rotating portion connected pivotably to the fixed portion. The side leg frame further includes an automatic direction-limiting mechanism connected to the push handle such that, when the push handle is at a selected one of the front and rear positions, relative rotation between the fixed portion and the rotating portion of a corresponding one of the front and rear wheel seats is prevented.

As such, since the direction of the front or rear wheels can be limited by the automatic direction-limiting mechanism when the stroller is moved, the moving direction of the stroller can be controlled easily.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
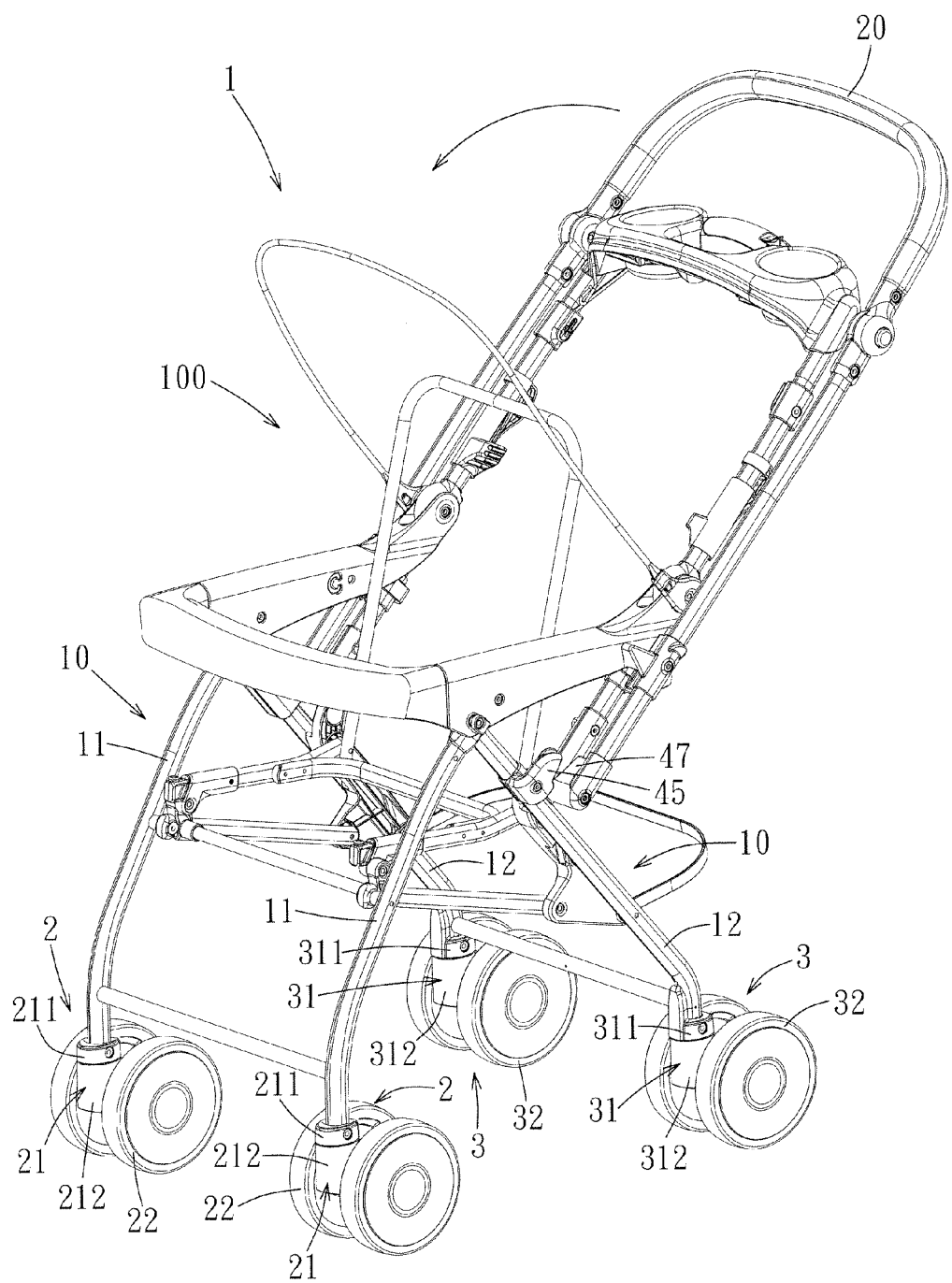
FIG. 1 is a perspective view of the first preferred embodiment of a direction changeable stroller according to this invention when a push handle is at a rear position.

Before the present invention is described in greater detail in connection with the preferred embodiments, it should be noted that similar elements and structures are designated by like reference numerals throughout the entire disclosure.

Figure 2:
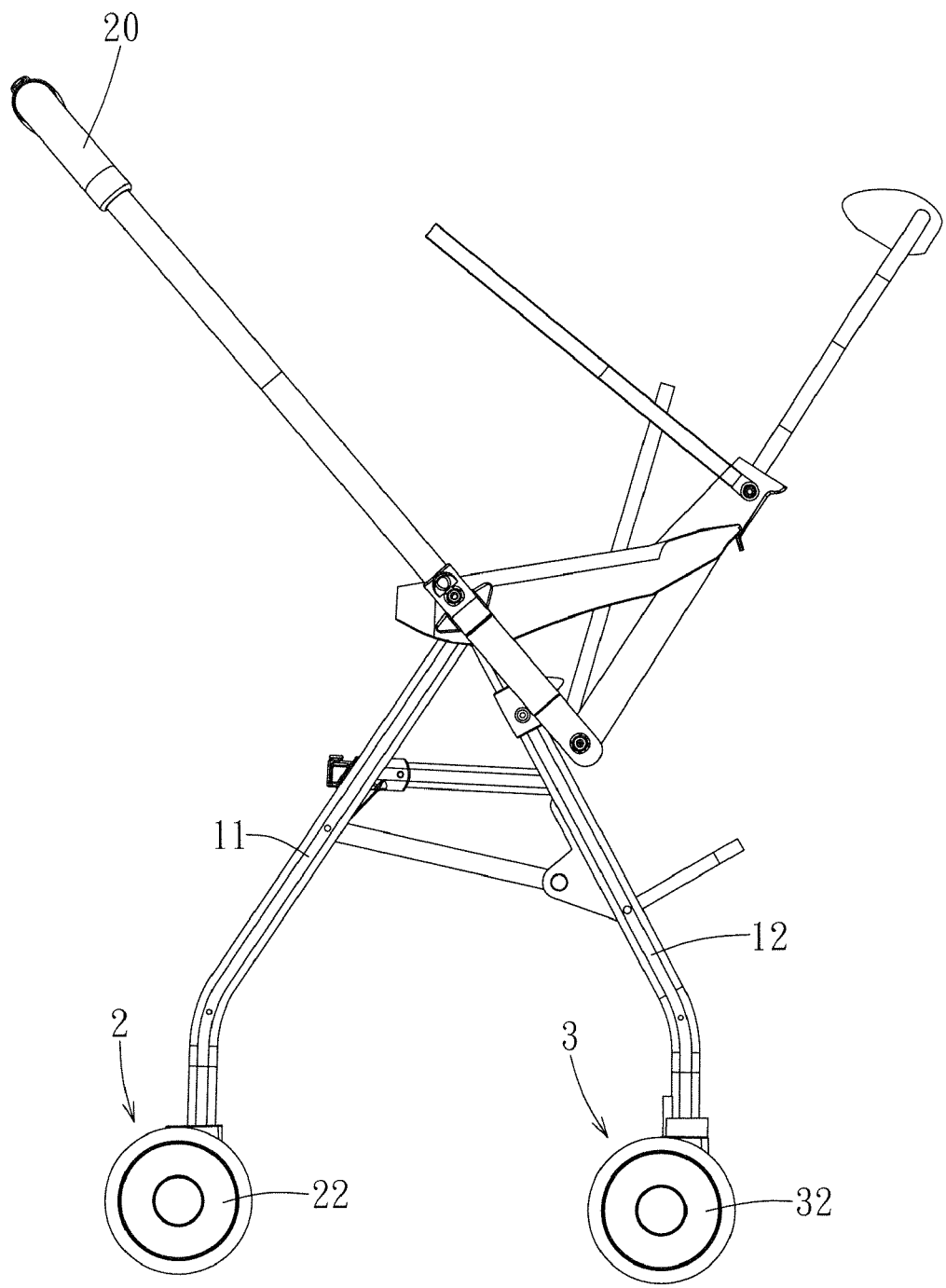
FIG. 2 is a schematic side view of the first preferred embodiment when the push handle is at a front position.

Referring to FIG. 1, the first preferred embodiment of a direction changeable stroller 1 according to this invention includes a frame unit 100. The frame unit 100 includes two symmetrical side leg frames 10 and a push handle 20. The push handle 20 is pivotable relative to the side leg frames 10 between a rear position (shown in FIG. 1) disposed at a rear end of the stroller 1, and a front position (shown in FIG. 2) disposed at a front end of the stroller 1 and in front of the rear position. Each of the side leg frames 10 includes a pair of front and rear leg tubes 11, 12, a front wheel assembly 2 disposed on a bottom end of the front leg tube 11, and a rear wheel assembly 3 disposed on a bottom end of the rear leg tube 12. The front wheel assembly 2 includes a front wheel seat 21 connected fixedly to the front leg tube 11, and a front wheel 22 connected to the front wheel seat 21. The front wheel seat 21 includes a front fixed portion 211 connected to the front leg tube 11, and a front rotating portion 212 connected pivotally to the front fixed portion 211 and connected to the front wheel 22. The rear wheel assembly 3 includes a rear wheel seat 31 connected fixedly to the rear leg tube 12, and a rear wheel 32 connected to the rear wheel seat 31. The rear wheel seat 31 includes a rear fixed portion 311 connected fixedly to the rear leg tube 12, and a rear rotating portion 312 connected pivotally to the rear fixed portion 311 and connected to the rear wheel 32.

Figure 3:
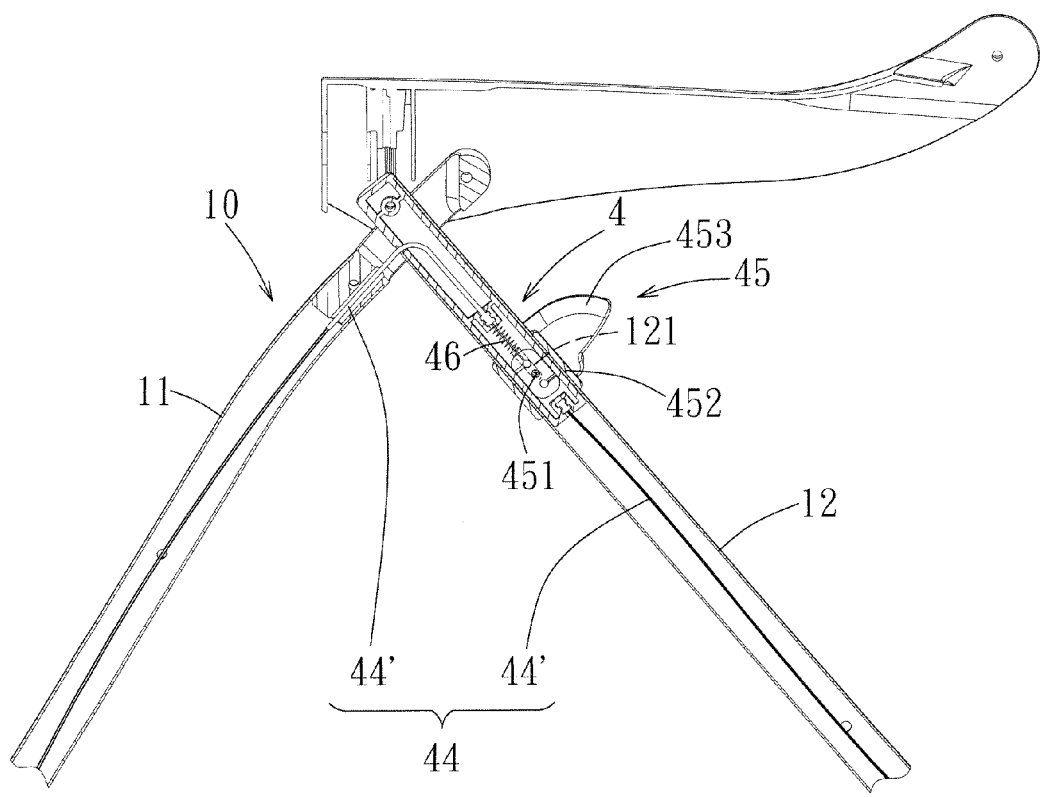
FIG. 3 is a fragmentary, partly sectional side view of the first preferred embodiment, illustrating a portion of an automatic direction-limiting mechanism.
Figure 4:
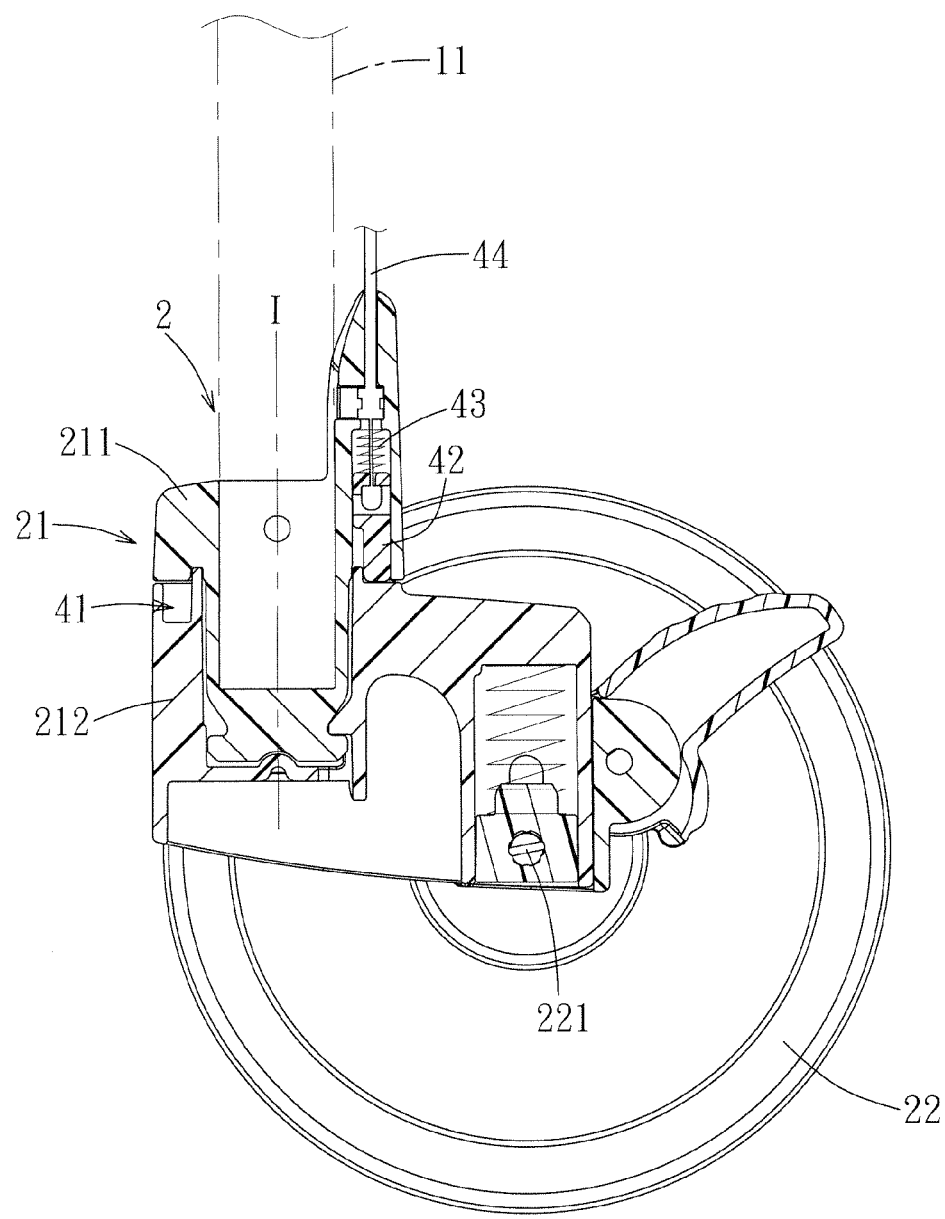
FIG. 4 is a sectional view of a front wheel assembly and another portion of the automatic direction-limiting mechanism of the first preferred embodiment.
Figure 5:
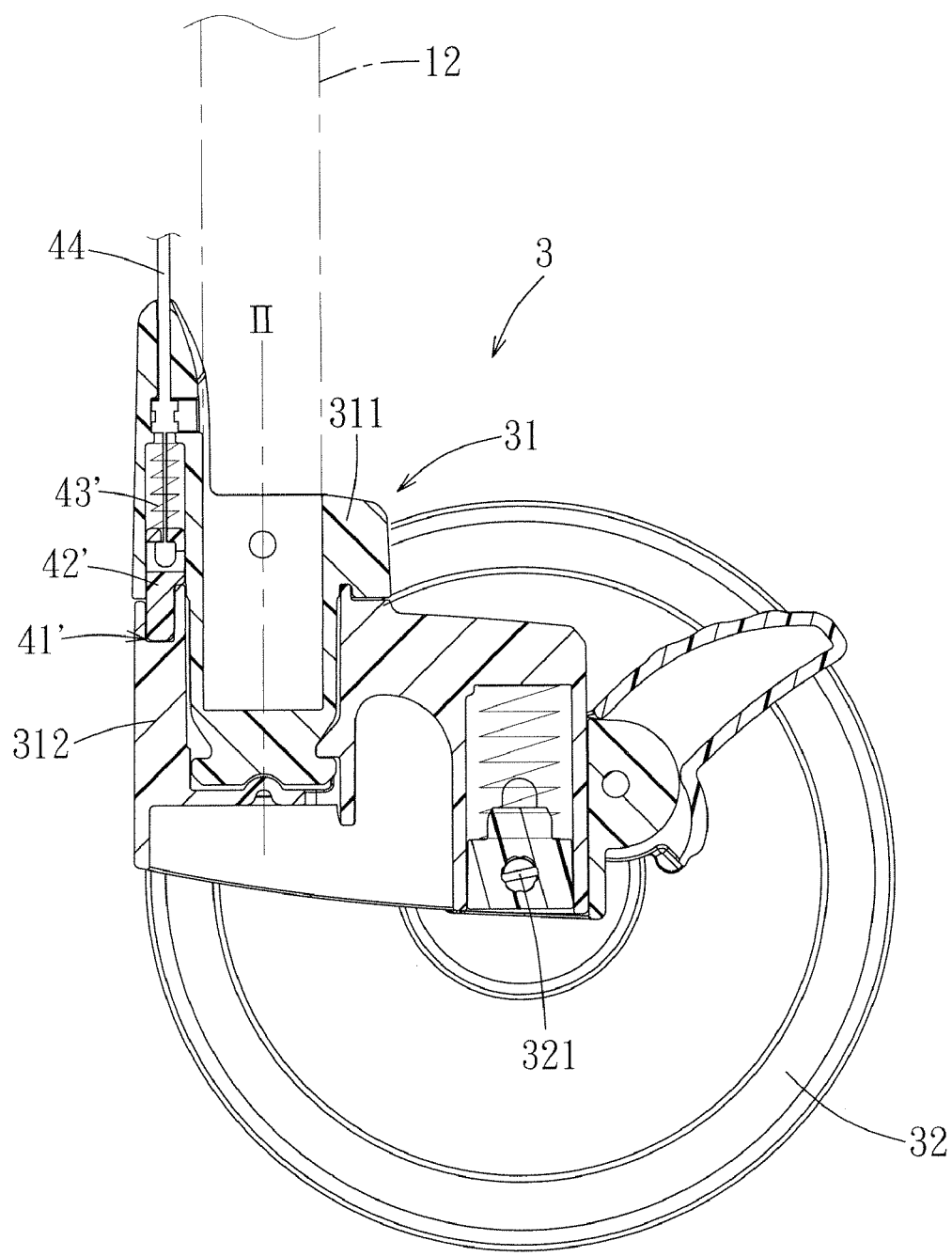
FIG. 5 is a sectional view of a rear wheel assemblies and still another portion of the automatic direction-limiting mechanism of the first preferred embodiment.

With further reference to FIGS. 3, 4, and 5, the stroller 1 further includes two automatic direction-limiting mechanisms 4. Each of the automatic direction-limiting mechanisms 4 corresponds to one of the side leg frames 10, one of the front wheel assemblies 2, and one of the rear wheel assemblies 3 at the same side. Each of the automatic direction-limiting mechanisms 4 includes front and rear positioning grooves 41, 41' formed respectively in the front and rear rotating portions 212, 312, front and rear automatic positioning members 42, 42' disposed respectively and movably on the front and rear fixed portions 211, 311 and extending respectively from the front and rear fixed portions 211, 311 toward the front and rear rotating portions 212, 312, two resilient members 43, 43' each biasing a corresponding one of the front and rear automatic positioning member 42, 42' toward a corresponding one of the front and rear positioning groove 41, 41', a braking member 44 interconnecting the two automatic positioning members 42, 42', a sliding member 45 disposed slidably on the corresponding rear leg tube 12 for driving the braking member 44, a returning member 46 for biasing the sliding member 45 toward its original position, and a driving member 47 disposed on an end of the push handle 20 adjacent to the corresponding rear leg tube 12. With particular reference to FIG. 4, the axle 221 of the front wheel 22 is connected to the front rotating portion 212, and is spaced apart from the rotating axis (I) of the front rotating portion 212. The front positioning groove 41 and the axle 221 of the front wheel 22 are disposed respectively at two sides of the rotating axis (I) of the front rotating portion 212. Similarly, with particular reference to FIG. 5, the axle 321 of the rear wheel 32 is connected to the rear rotating portion 312, and is spaced apart from the rotating axis (II) of the rear rotating portion 312. The rear positioning groove 41' and the axle 321 of the rear wheel 32 are disposed respectively at two sides of the rotating axis (II) of the rear rotating portion 312. The front automatic positioning member 42 is disposed behind and adjacent to the bottom end of the front leg tube 11, as shown in FIG. 4. The rear automatic positioning member 42' is disposed in front of the bottom end of the rear leg tube 12.

Since the two side leg frames 10 are identical in structure to each other, and since the two automatic direction-limiting mechanisms 4 are identical in structure to each other, the structures and operations of only one of the side leg frames 10 and one of the automatic direction-limiting mechanisms 4 at the same side, and the push handle 20 will be described in the succeeding paragraphs.

Figure 6:
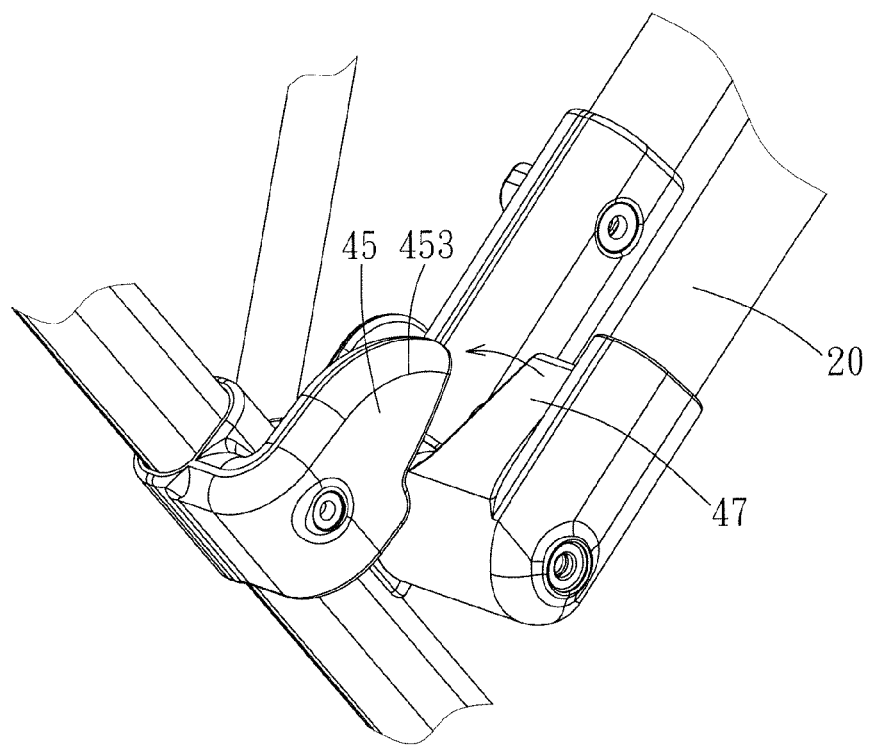
FIG. 6 is a perspective view of a driving member and a sliding member of the automatic direction-limiting mechanism of the first preferred embodiment.
Figure 7:
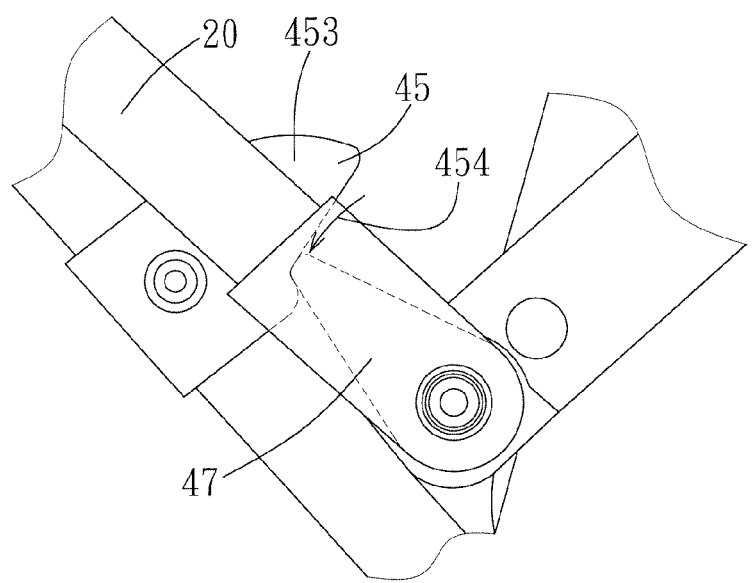
FIG. 7 is a fragmentary side view of the first preferred embodiment, illustrating how the driving member is moved on the sliding member along a guiding path.

With particular reference to FIGS. 1 and 3, the sliding member 45 includes a sliding block 451 disposed movably within the rear leg tube 12 and connected to the driving member 44, a sleeve portion 452 sleeved movably on the rear leg tube 12 and connected to the sliding block 451, and a lug 453 extending from the sleeve portion 452 and permitting contact of the driving member 47 therewith. With particular reference to FIGS. 3, 6, and 7, the lug 453 of the sliding member 45 extends toward the push handle 20 such that, the push handle 20 is operable to pivot the driving member 47 relative to the side leg frame 10 to contact the lug 453. The sliding member 45 has a guiding path 454 for guiding movement of the driving member 47 on the sliding member 45 therealong so as to push and move the sliding member 45 on the rear leg tube 12 when the push handle 20 is changed from the rear position to the front position. The rear leg tube 12 is formed with a pair of slots 121 so as to permit the sliding block 451 to be riveted to the sleeve portion 452. The returning member 46 is disposed within the rear leg tube 12, and has one end abutting against the sliding block 451, and the other end fastened to the rear leg tube 12.

In this embodiment, the braking member 44 includes two cables 44' (see FIG. 3) connected respectively to two opposite ends of the sliding member 45, and the resilient members 43, 43' and the returning member 46 are springs. The braking member 44 is disposed within hollow portions of the front and rear leg tubes 11, 12, extends outwardly from the same at two positions respectively adjacent to the front and rear wheel seats 21, 31, and has two ends connected respectively to the front and rear automatic positioning members 42, 42'.

With particular reference to FIGS. 1, 4, and 5, when the push handle 20 is disposed at the rear position shown in FIG. 1, the stroller 1 can be pushed to move forwardly. In the rear position, with particular reference to FIG. 4, due to the biasing action of the returning member 46, the sliding member 45 pulls the braking member 44 rearwardly to remove the front automatic positioning members 42 from the front positioning groove 41, thereby allowing for free rotation of the front wheel 22 and compressing the corresponding resilient member 43. Also in the rear position, with particular reference to FIG. 5, the rear automatic positioning member 42' is biased by the corresponding resilient member 43' to engage the rear positioning groove 41' to thereby prevent free rotation of the rear rotating portion 312 so as to limit the directions of the rear wheel 32.

Figure 8:
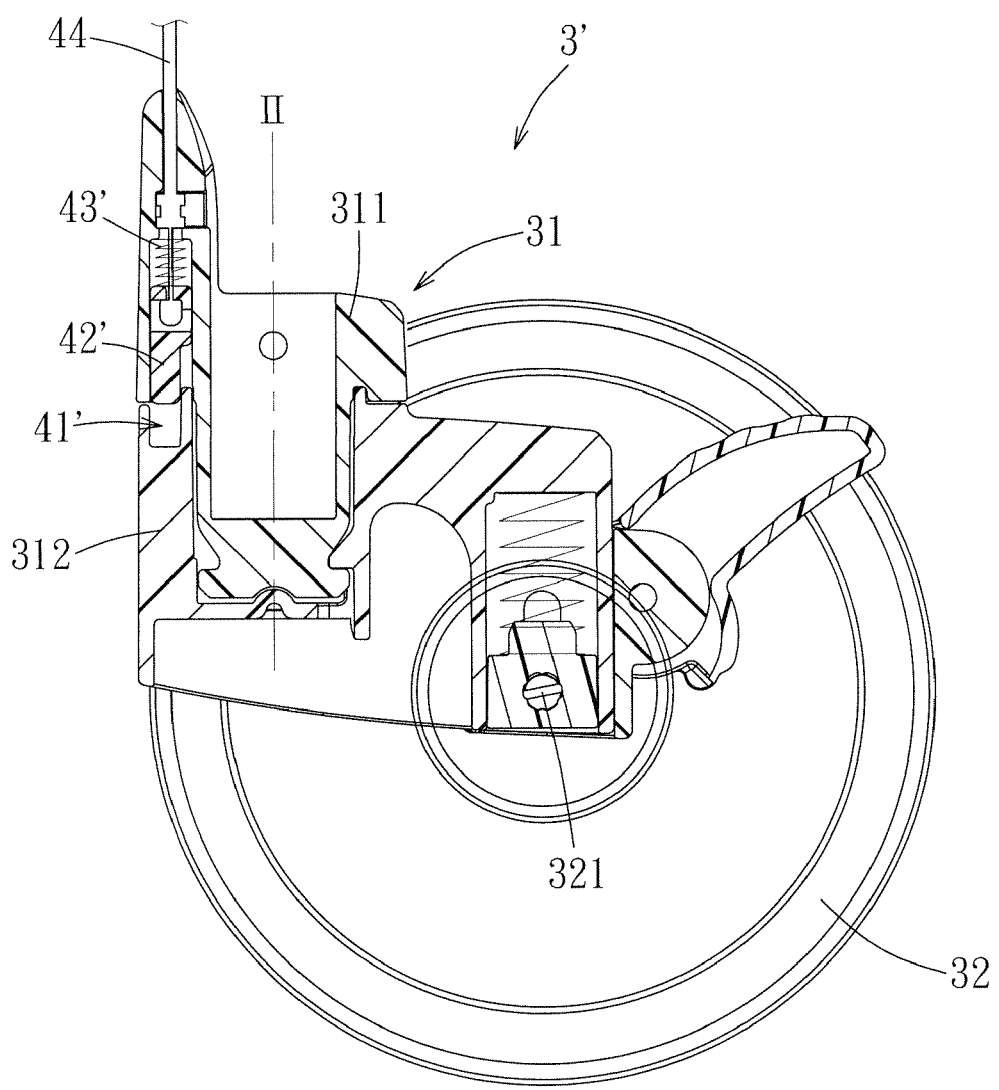
FIG. 8 is a view similar to FIG. 4 but illustrating how a rear automatic positioning member is removed from a rear positioning groove in a rotating portion of a rear wheel seat.

With further reference to FIGS. 6 and 7, when the push handle 20 is pivoted forwardly from the rear position to the front position, the driving member 47 disposed on the push handle 20 comes into contact with the lug 453 to thereby move along the guiding path 454. Hence, the driving member 47 applies to a pushing force to the sliding member 45 so as to move the sliding member 45 toward a front end of the rear leg tube 12 against the biasing action of the returning member 46 to thereby move the braking member 44 toward the front wheel seat 21, and the rear automatic positioning member 42' is pulled by the braking member 44 to remove from the rear positioning groove 41', as shown in FIG. 8, such that the braking member 44 and the rear automatic positioning member 42' are moved by the same distance. Consequently, the rear rotating portion 312 is released from the rear fixed portion 311 to allow for free rotation of the rear wheel 32. Movement of the braking member 44 toward the front wheel seat 21 results in release of a pulling force applied to the front automatic positioning member 42 by the braking member 44. Subsequently, since the axle 221 of the front wheel 22 is spaced apart from the rotating axis (I) of the front rotating portion 212, as described above, when the stroller 1 is pushed rearwardly such that the front wheel assembly 2 is located at the trailing side relative to the moving direction of the stroller 1, the front wheel 22 rotates about the rotating axis (I) of the front rotating portion 212 until the axle 221 of the front wheel 22 is disposed in front of the bottom end of the front leg tube 11 to allow the front positioning groove 41 to align with the front automatic positioning member 42, and the rear wheel 32 rotates about the rotating axis (II) of the rear rotating portion 312 until the axle 321 of the rear wheel 32 is disposed in front of the bottom end of the rear leg tube 12 to allow the rear positioning groove 41' to be misaligned from the rear automatic positioning member 42'. Hence, the front automatic positioning member 42 is biased by the corresponding resilient member 43 to engage the front positioning groove 41. That is, when the push handle 20 is pivoted from the rear position to the front position and subsequently is pushed to move the stroller 1 rearwardly, the front and rear rotating portions 212, 312 rotate respectively about the rotating axes (I, II) thereof by an angle of 180 degrees, and the direction of the front wheel 22 (now located at the trailing side of the stroller 1) is limited by the automatic direction-limiting mechanism 4.

Similarly, when the push handle 20 is pivoted rearwardly from the front position to the rear position, the driving member 47 disposed on the push handle 20 is removed from the lug 453. Hence, the sliding member 45 is biased toward its original position by the returning member 46 to thereby move the braking member 44 toward the rear wheel seat 31 so that the front automatic positioning member 42 is removed from the front positioning groove 41 by the braking member 44. Consequently, the front rotating portion 212 is released from the front fixed portion 211 to allow for free rotation of the front wheel 21. Movement of the braking member 44 toward the rear wheel seat 31 results in release of a pulling force applied to the rear automatic positioning member 42' by the braking member 44. Subsequently, when the stroller 1 is pushed forwardly, the rear wheel 32 rotates about the rotating axis (II) of the rear rotating portion 3212 until the axle 321 of the rear wheel 32 is disposed behind the bottom end of the rear leg tube 12 to allow the rear positioning groove 41' to align with the rear automatic positioning member 42', as shown in FIG. 5, and the front wheel 22 rotates about the rotating axis (I) of the front rotating portion 212 until the axle 221 of the front wheel 22 is disposed behind the bottom end of the front leg tube 11 to allow the front positioning groove 41 to be misaligned from the front automatic positioning member 42, as shown in FIG. 4. Hence, the rear automatic positioning member 42' is biased by the corresponding resilient member 43' to engage the rear positioning groove 41'. That is, when the push handle 20 is pivoted from the front position to the rear position and subsequently is pushed to move the stroller 1 forwardly, the front and rear rotating portions 212, 312 rotate respectively about the rotating axes (I, II) thereof by an angle of 180 degrees, and the direction of the rear wheel 32 (now located at the trailing side of the stroller 1) is limited by the automatic direction-limiting mechanism 4.

As such, when the push handle 20 is at the rear position, the direction of the rear wheel 32 is automatically limited, and free rotation of the front wheel 22 is allowed, and when the push handle 20 is at the front position, the direction of the front wheel 22 is automatically limited, and free rotation of the rear wheel 32 is allowed. Since the direction of only one of the front and rear wheels 22, 32 at the trailing side relative to the moving direction of the stroller 1 is limited, the moving direction of the stroller 1 can be controlled with ease.

Figure 9:
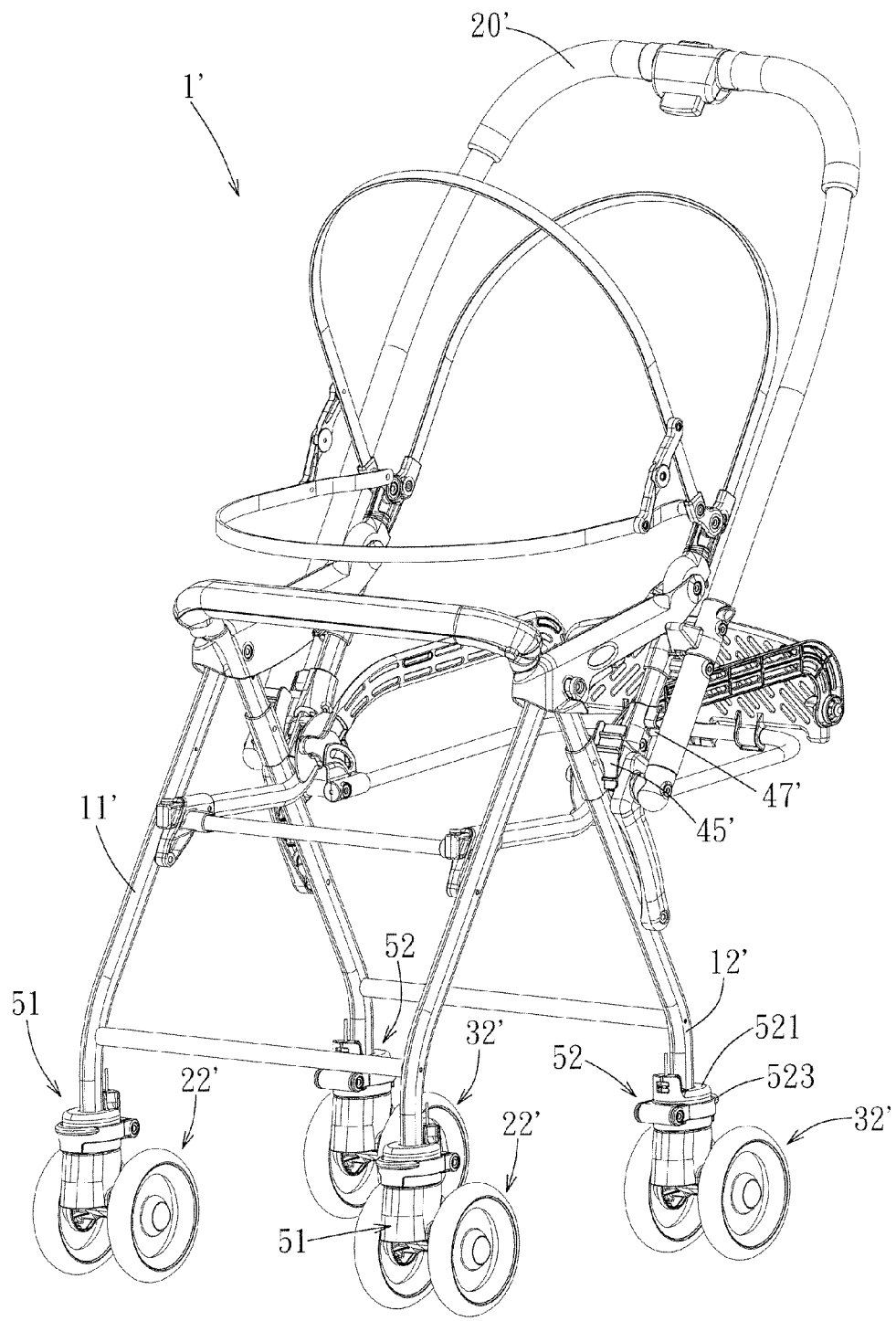
FIG. 9 is a perspective view of the second preferred embodiment of a direction changeable stroller according to this invention.
Figure 10:
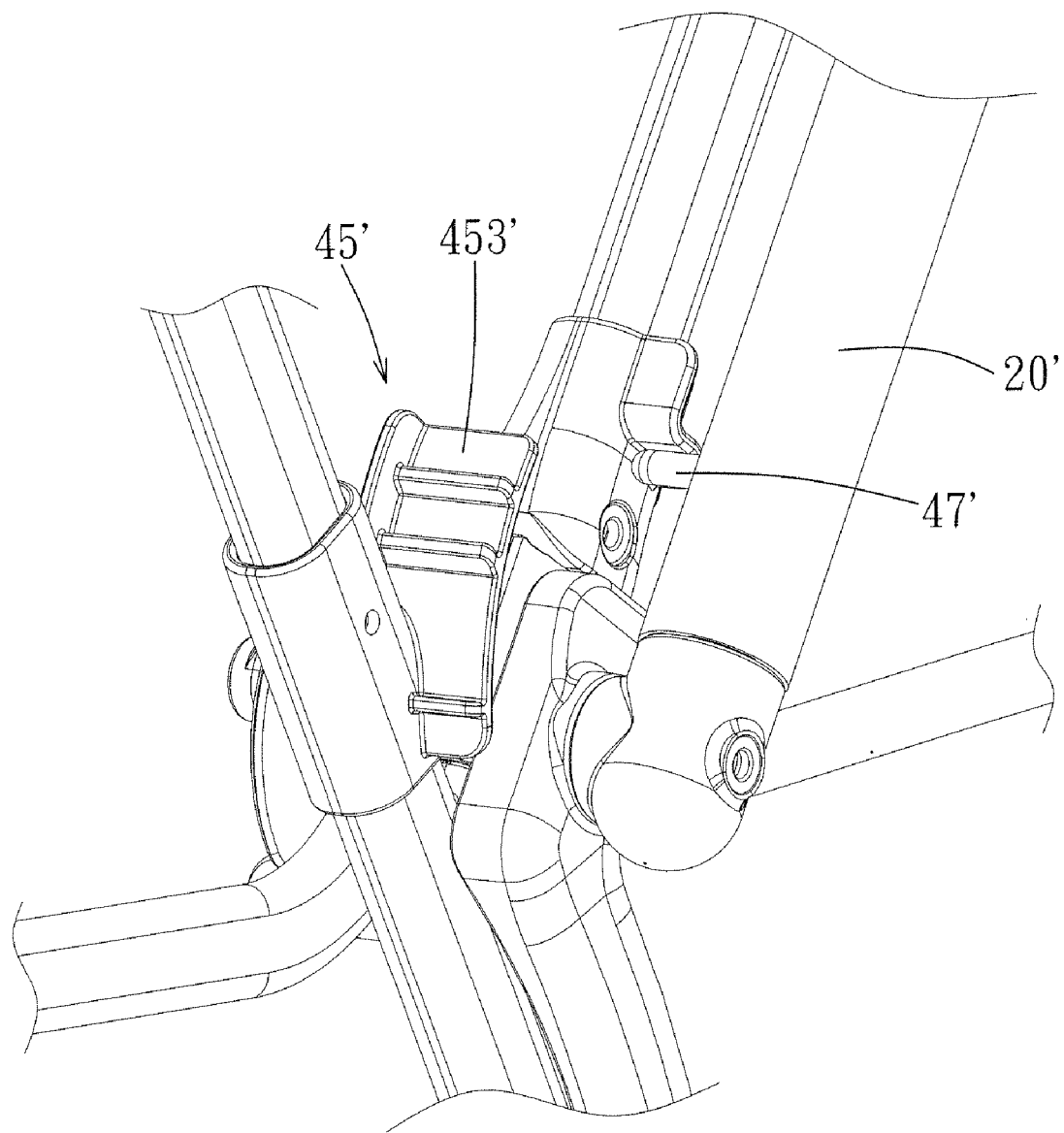
FIG. 10 is a perspective view of a driving member and a sliding member of an automatic direction-limiting mechanism of the second preferred embodiment.
Figure 11:
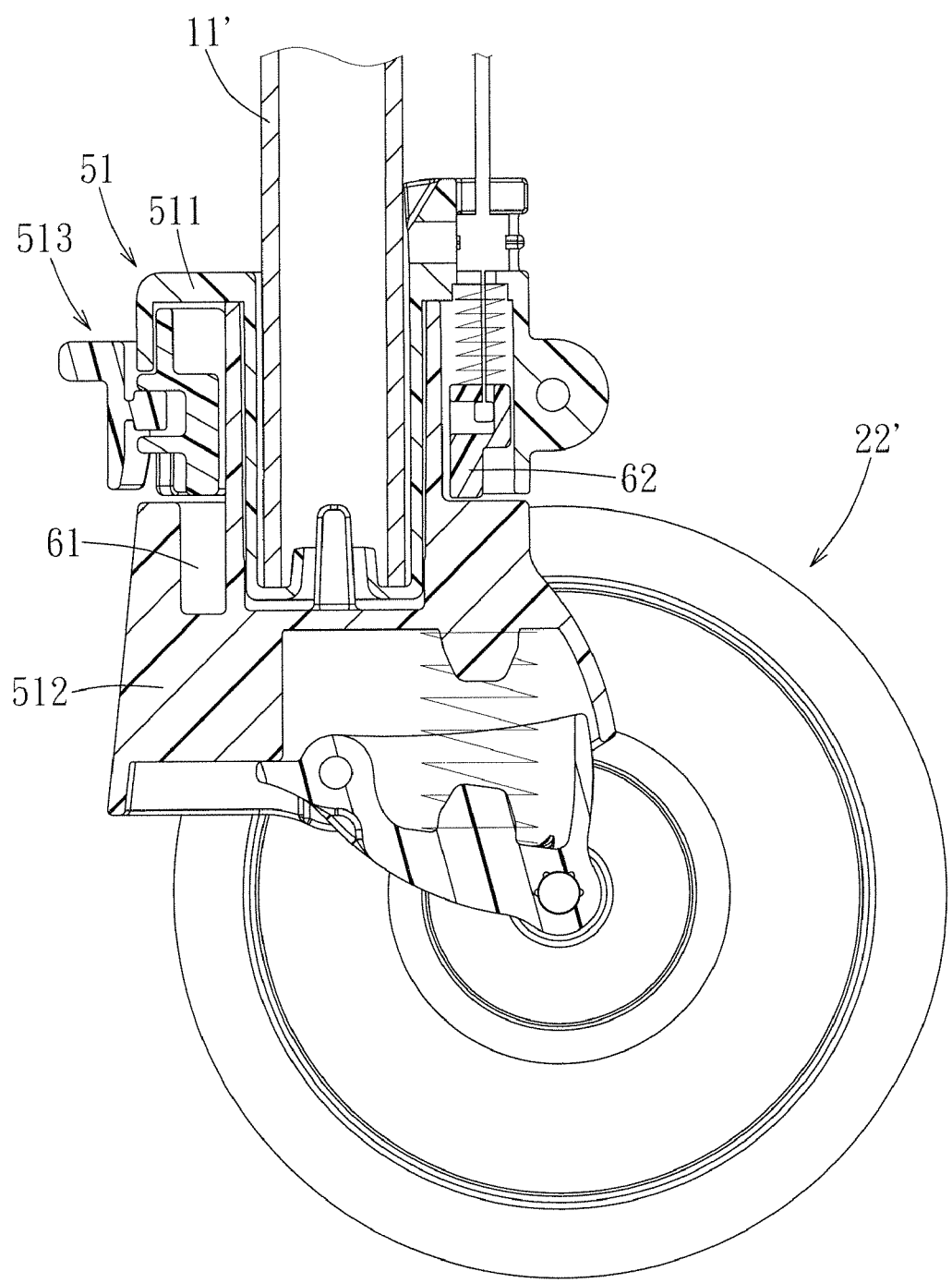
FIG. 11 is a sectional view of a front wheel assembly of the second preferred embodiment.

FIGS. 9 and 10 show the second preferred embodiment of a direction changeable stroller 1' according to this invention, which is similar to the first preferred embodiment. The difference between the first and second preferred embodiments is described in the following. Each of the lug 453 of the sliding member 45 and the driving member 47 of the first preferred embodiment is configured as a block. In the second preferred embodiment, however, the lug 453' of the sliding member 45' is configured as a plate having a guiding surface, and the driving member 47 is configured as a pin. In addition, with further reference to FIG. 11, the front wheel seat 51 further includes a front manual positioning member 513 disposed on the front fixed portion 511. The front manual positioning member 513 and the front automatic positioning member 62 are disposed respectively at two sides of the bottom end of the front leg tube 11'. When the push handle 20' is disposed at the rear position so that the direction of the rear wheel 32' is limited, the front positioning groove 61 is aligned with the front manual positioning member 513. At this time, the front manual positioning member 513 can be operated to engage the front positioning groove 61 so as to limit the direction of the front wheel 22'. As such, the directions of the front and rear wheels 22', 32' can be limited when the push handle 20' is disposed at the rear position. Similarly, the rear wheel seat 52 further includes a rear manual positioning member 523 disposed on the rear fixed portion 521. The rear manual positioning member 523 is similar to the front manual positioning member 513 in structure, operation, and function. That is, the rear manual positioning member 523 and the rear automatic positioning member (not shown) are disposed respectively at two sides of the bottom end of the rear leg tube 12'. When the push handle 20' is disposed at the front position so that the direction of the front wheel 22' is limited, the rear manual positioning member 523 can be operated to limit the directions of the rear wheel 32'. As such, through operation of the front or rear manual positioning member 513, 523, the directions of the front and rear wheels 22', 32' can be limited whether the push handle 20' is disposed at the front or rear position.

With this invention thus explained, it is apparent that numerous modifications and variations can be made without departing from the scope and spirit of this invention. It is therefore intended that this invention be limited only as indicated by the appended claims.

We claim:

1. A direction changeable stroller comprising a frame unit, said frame unit including at least one side leg frame and a push handle pivotable relative to said side leg frame between a front position and a rear position disposed behind the front position, said side leg frame including a pair of front and rear leg tubes, and a pair of front and rear wheel assemblies disposed respectively on bottom ends of said front and rear leg tubes, said front wheel assembly including a front wheel seat connected to said front leg tube, and a front wheel connected to said front wheel seat, said rear wheel assembly including a rear wheel seat connected to said rear leg tube, and a rear wheel connected to said rear wheel seat, each of said front and rear wheel seats including a fixed portion connected fixedly to a corresponding one of said front and rear leg tubes, and a rotating portion connected pivotably to said fixed portion, said side leg frame further including an automatic direction-limiting mechanism that is connected to said push handle such that, when said push handle is at a selected one of the front and rear positions, relative rotation between said fixed portion and said rotating portion of a corresponding one of said front and rear wheel seats is prevented, wherein said front wheel seat further includes a front manual positioning member disposed on said fixed portion of said front wheel seat and engageable within said front positioning groove when said rotating portion of said front wheel seat is pivoted relative to said fixed portion of said front wheel seat to align said front positioning groove with said front manual positioning member, said front manual positioning member and said front automatic positioning member being disposed respectively at two sides of said bottom end of said front leg tube, said rear wheel seat further including a rear manual positioning member disposed on said fixed portion of said rear wheel seat and engageable within said rear positioning groove when said rotating portion of said rear wheel seat is pivoted relative to said fixed portion of said rear wheel seat to align said rear positioning groove with said rear manual positioning member, said rear manual positioning member and said rear automatic positioning members being disposed respectively at two sides of said bottom end of said rear leg tube.

2. The direction changeable stroller as claimed in claim 1, wherein said automatic direction-limiting mechanism includes front and rear positioning grooves formed respectively in said rotating portions of said front and rear wheel seats, front and rear automatic positioning members disposed respectively and movably on said fixed portions of said front and rear wheel seats and engageable respectively within said front and rear positioning grooves, a braking member interconnecting said front and rear automatic positioning members, a sliding member disposed slidably on said rear leg tube, and a driving member disposed on said push handle and adjacent to said sliding member, such that a change of said push handle between the front and rear positions resulting in contact of said driving member with said sliding member, so that said driving member pushes and moves said sliding member along said rear leg tube to activate said braking member to thereby remove a corresponding one of said front and rear automatic positioning members from a corresponding one of said front and rear positioning grooves, thus allowing for rotation of a corresponding one of said rotating portions relative to a corresponding one of said fixed portions.

3. The direction changeable stroller as claimed in claim 2, wherein said direction-limiting mechanism further includes two resilient members each biasing a corresponding one of said front and rear automatic positioning members toward a corresponding one of said front and rear positioning grooves, and a returning member for biasing said sliding member to return to its original position such that, when said push handle is pivoted from the rear position to the front position, said driving member contacts and pushes said sliding member to move said braking member toward said front wheel seat, thereby removing said rear automatic positioning member from said rear positioning groove, and allowing said front automatic positioning member to be biased by a corresponding one of said resilient members into said front positioning groove to thereby limit direction of said front wheel; and when said push handle is pivoted from the front position to the rear position, said driving member is removed from said sliding member, thereby removing said front automatic positioning member from said front positioning groove due to the biasing action of said returning member, and allowing said rear automatic positioning member to be biased by a corresponding one of said resilient members into said rear positioning groove to thereby limit direction of said rear wheel.

4. The direction changeable stroller as claimed in claim 1, wherein each of said front and rear wheel assemblies further includes an axle connected to said rotating portion of a corresponding one of said front and rear wheel seats, said axle of said front wheel assembly being spaced apart from a rotating axis of said rotating portion of said front wheel seat, said axle of said front wheel assembly and said front positioning groove being positioned respectively at two sides of the rotating axis of said rotating portion of said front wheel seat, said axle of said rear wheel assembly being spaced apart from a rotating axis of said rotating portion of said rear wheel seat, said axle of said rear wheel assembly and said rear positioning groove being positioned respectively at two sides of the rotating axis of said rotating portion of said rear wheel seat.

5. The direction changeable stroller as claimed in claim 4, wherein said front automatic positioning member is disposed behind and adjacent to a bottom end of said front leg tube, and said rear automatic positioning member is disposed in front of and adjacent to a bottom end of said rear leg tube.

6. The direction changeable stroller as claimed in claim 2, wherein said sliding member of said automatic direction-limiting mechanism includes a sliding block disposed movably within said rear leg tube and connected to said braking member, a sleeve portion sleeved movably on said rear leg tube and connected to and co-movable with said sliding block, and a lug extending from said sleeve portion and permitting said driving member to contact therewith.

7. The direction changeable stroller as claimed in claim 6, wherein said rear leg tube is formed with a pair of slots so as to permit said sliding block to be riveted to said sleeve portion.

8. The direction changeable stroller as claimed in claim 2, wherein said braking member is configured as two cables connected respectively to two opposite ends of said sliding member.

9. The direction changeable stroller as claimed in claim 6, wherein said lug extends toward said push handle, such that said push handle is operable to pivot said driving member relative to said side leg frame to contact said lug.

10. The direction changeable stroller as claimed in claim 2, wherein said sliding member has a guiding path for guiding movement of said driving member on said sliding member therealong so as to push and move said sliding member on said rear leg tube when said push handle is pivoted from one of the front and rear positions to the other of the front and rear positions.

11. The direction changeable stroller as claimed in claim 3, wherein said sliding member has a guiding path for guiding movement of said driving member on said sliding member therealong so as to push and move said sliding member on said rear leg tube when said push handle is pivoted from one of the front and rear positions to the other of the front and rear positions.

12. The direction changeable stroller as claimed in claim 9, wherein said sliding member is movable in response to a change of said push handle between the front and rear positions by a distance that is the same as that of each of said front and rear automatic positioning members.

* * * * *